United States Patent [19]

Clark

[11] 3,861,425
[45] Jan. 21, 1975

[54] COATING COMPOSITION

[75] Inventor: Vincent De Paul Clark, Heath, Ohio

[73] Assignee: Owens-Corning Fiberglas Corporation, Toledo, Ohio

[22] Filed: Sept. 17, 1973

[21] Appl. No.: 398,043

Related U.S. Application Data

[60] Division of Ser. No. 205,288, Dec. 6, 1971, , which is a continuation-in-part of Ser. No. 862,040, Sept. 29, 1969.

[52] U.S. Cl. ...... 138/149, 117/126 R, 117/126 GQ, 138/145, 138/DIG. 2, 260/29.6 R, 260/29.6 MM
[51] Int. Cl. ............................................. F16l 9/14
[58] Field of Search ...... 138/145, 146, 149, DIG. 2; 117/126 R, 126 GQ, 136; 260/29.6 R, 29.6 MM, 17 R, 17.4 R, 17.4 ST

[56] References Cited
UNITED STATES PATENTS

| | | | |
|---|---|---|---|
| 2,809,949 | 10/1957 | Orth | 260/29.6 MM |
| 3,062,677 | 11/1962 | Wong | 260/29.6 MM |
| 3,078,880 | 2/1963 | Stephens | 138/149 X |
| 3,092,529 | 6/1963 | Pearson | 138/149 |
| 3,212,529 | 10/1965 | Ullman et al. | 138/145 X |
| 3,213,051 | 10/1965 | Pierce | 260/29.6 MM |
| 3,215,660 | 11/1965 | Bryan et al. | 260/29.6 MM |
| 3,394,737 | 7/1968 | Hoffman et al. | 138/109 |
| 3,671,303 | 6/1972 | Meither | 260/29.6 R |

Primary Examiner—John W. Huckert
Assistant Examiner—Charles Gorenstein
Attorney, Agent, or Firm—Carl G. Staelin; John W. Overman; Patrick P. Pacella

[57] ABSTRACT

A water base, hardenable coating composition is disclosed for use on the inner or air conducting surfaces of fibrous glass thermal insulation employed in heating, cooling or ventilating conduits. The coating comprises, by weight: 70 to 90 percent of aluminum or magnesium hydrate; 5 to 20 percent of a binder such as vinyl acrylic latex or polyethylene vinyl acetate latex; and 1 to 10 percent of a flame retardant such as a sodium borate or boric acid.

4 Claims, No Drawings

COATING COMPOSITION

This is a division of application Ser. No. 205,288, filed Dec. 6, 1971, which is a continuation-in-part of my copending application Ser. No. 862,040 filed Sept. 29, 1969.

BACKGROUND OF THE INVENTION

Conduits and ducts either composed of or lined with fibrous glass insulation media such as batts, mats, boards or the like are commonly used in heating, cooling and ventilating systems. The construction and method of raking these conduits is described in U.S. Pat. Nos. 3,092,529; 3,212,529 and 3,394,737. A protective coating or film is generally applied to the inner air directing surfaces of these ducts to insure a smooth, low friction producing surface being presented to air flowing through and being directed by the duct.

The properties commonly required of these coating include a smooth surface when dried or hardened, water or moisture resistance, ability to be applied by dipping, brushing, spraying or the like and low flame spread and smoke characteristics. Flexibility of the coating without cracking or breaking away from the fibrous glass surface after it is hardened is also highly desirable when the coating is applied to flexible ducts.

SUMMARY OF THE INVENTION

This invention discloses a hardenable, water base coating composition. The coating is particularly useful when applied to the inner or air conducting surfaces of fibrous glass insulating materials used in rigid or flexible heating, cooling or ventilating ducts. The inventive coating comprises, by weight, 70 to 90 percent of a flame retardant filler such as aluminum or magnesium hydrate; 5 to 20 percent of a binder such as vinyl acrylic latex, or polyethylene vinyl acetate latex; and 1 to 10 percent of a fire retardant sodium borate or boric acid.

DESCRIPTION OF THE INVENTION

The coating composition of this invention may be represented by the following general formulation:

| Ingredient | Parts* |
| --- | --- |
| Fire retardant filler | 70 to 90 |
| Binder | 5 to 20 |
| Fire retardant borate | 1 to 10 |

* The terms "percent" (%) and "parts" are used herein and in the appended claims to refer to percent and parts by weight of coating solids, unless otherwise indicated.

A preferred composition is:

| Ingredient | Parts |
| --- | --- |
| Fire retardant filler | 80 to 85 |
| Binder | 10 to 15 |
| Fire retardant borate | 2 to 4 |

The combination of the following ingredients in the stated broad and preferred proportions results in a hardenable yet flexible protective coating when applied to fibrous glass duct insulation as an aqueous dispersion or emulsion:

| | Parts | |
| Ingredient | Broad | Preferred |
| --- | --- | --- |
| Aluminum hydrate or magnesium hydrate or combination thereof | 70 to 90 | 80 to 85 |
| Vinyl acrylic latex, polyethylene vinyl acetate latex or combination thereof | 5 to 20 | 10 to 15 |
| Sodium borate, boric acid or combination thereof | 1 to 10 | 2 to 4 |

It has been found that aluminum hydrate ($Al_2O_3 \cdot 3H_2O$ or $Al(OH)_3$) or magnesium hydrate ($Mg(OH)_2$) are particularly suited as fire retardant fillers for use in this coating. In addition to serving as low cost fillers or bulking agents, the water of hydration held by both of these compounds is useful as a flame and smoke depressant or retardant. Aluminum hydrate, for example, consists of about 35 percent by weight of water. At temperatures of approximately 575°F. or above, this water of hydration is liberated and aids in flame quenching. To attain the proper mixture of this filler ingredient in an aqueous or water base solution, it has been found that the aluminum hydrate or magnesium hydrate preferably should have a particle size such that, on a dry basis, at least 70 percent of the material will pass through a 325 mesh screen.

The binder component of the coating composition holds together or binds the other stated ingredients (and other minor additives) after the coating has dried to a hardened, yet flexible, state on the fibrous glass insulation. The binder also bonds the coating to the fibrous glass. In terms of cost, availability and performance vinyl acrylic latex or polyethylene vinyl acetate latex are believed to be the most satisfactory binders. Each of these can be easily obtained, handled mixed and applied in the form of a stable aqueous emulsion or dispersion. These binders also impart the desired degree of flexibility to the coating after it has dried or hardened on the fibrous glass insulation surface. Flexibility is, of course, a key factor when the coating is used on flexible ducts of the type described in the previously mention U.S. Pat. No. 3,394,737.

The term "vinyl acrylic" as used herein refers to copolymers having a vinyl component, e.g., vinyl acetate, and an acrylic or acrylate component, e.g., butyl acrylate. Suitable vinyl acrylic copolymers contain 20–25 percent of an acrylic component and about 75–80 percent of a vinyl component.

The term "polyethylene vinyl acetate" as used herein refers to copolymer of vinyl acetate and polyethylene. Suitable polyethylene vinyl acetate copolymers would have about 10–15 percent polyethylene and 85–90 percent vinyl acetate.

The fire retardant borate which completes the coating formulation may be chosen from any available form of sodium borate. Boric acid may also be used. Any common form of a sodium borate may be used, including sodium meta-borate ($NaBO_2$; $NaBO_2 \cdot 2H_2O$), sodium tetraborate ($Na_2B_4O_7$; $Na_2B_4O_7 \cdot 5H_2O$) and borax ($Na_2B_4O_7 \cdot 10H_2O$).

Each of the above disclosed fillers, binders and borates may be used individually or in combination, within the stated proportions, to produce coatings possessing comparable properties.

In addition to the above components, other additives may be used in minor amounts to tailor the coating to fit specific needs. A thickening agent may be added in amounts necessary to thicken the coating for brush or roller application, as opposed to spray applications where a thinner consistency is required. Although the amount of thickening agent used will depend upon the application consistency desired, satisfactory results have been obtained using 0.1 to 2 percent of a nonionic water soluble thickener. Excellent results have been obtained with cellulosic thickeners such as hydroxy methyl cellulose and hydroxy ethyl cellulose. Other thickeners which may be used include water dispersible gums, starches and resins. Mineral agents such as bentonite clay or other inorganic thickeners could also be employed.

Fungicides or fungistats, generally in amounts of 0.1 to 2 percent, may be used in cases where the air conducting duct will be exposed to humid, damp or other atmospheric conditions conducive to fungus growth.

Additions of sodium tripolyphosphate have been found effective in aiding dispersion of the aluminum or magnesium hydrate; generally less than 1 to 2 percent is required.

From 0.1 to 2 percent additions of wetting agents have been found helpful if difficulty is experienced in dispersing or emulsifying the ingredients; similar additions of anti-foaming agents can be employed if excess foaming is experienced during mixing.

Examples or representative coatings which may be formulated in accordance with the principles of the invention follow:

Example 1

| Ingredient | Amount |
| --- | --- |
| Water | 175 gallons |
| Aluminum hydrate | 3750 pounds |
| Vinyl acrylic latex (55% solids) | 1150 pounds |
| Sodium borate | 120 pounds |

After all the ingredients are added to and mixed in a mixing tank, high speed mixing of from 10 to 15 minutes is sufficient to disperse all the ingredients. The coating may then be applied to fibrous glass insulation by spraying, brushing or the like.

EXAMPLE 2

| Ingredient | Amount |
| --- | --- |
| Water | 175 gallons |
| Aluminum hydrate | 3750 pounds |
| Vinyl acrylic latex (55% solids) | 1150 pounds |
| Sodium borate | 120 pounds |
| Sodium tripolyphosphate | 14 pounds |
| Fungicide | 2 pounds |
| Thickening agent | 28 pounds |
| Anti-foaming agent | 10 pounds |
| Wetting agent | 5 pounds |

In the above examples, the ingredients used were:
a. aluminum hydrate ($Al_2O_3 \cdot 2H_2O$ or $Al(OH)_3$); available from Aluminum Company of America, under "C-31 Fine" trade designation;
b. vinyl acrylic latex: 55 percent solids, aqueous latex of a copolymer comprising about 80 percent vinyl acetate and about 20 percent butyl acrylate;
c. sodium borate: available from United States Borax & Chemical Corporation, under "FR-28" trade designation;
d. sodium tripolyphosphate, $Na_5P_3O_{10}$ (anhydrous); available from Stauffer Chemical Company; under trade designation "STPP" or "TSPP";
e. fungicide: 2,3,5,6-tetrachloro-4-(methyl sulfonyl) pyridine, available from Dow Chemical Company under "Dowicil S-13" trade designation;
f. thickening agent: hydroxy ethyl cellulose available from Union Carbide, under "Cellosize WP-40" trade designation;
g. anti-foaming agent: hydrophobic silica type defoamer of the kind described in U.S. Pat. Nos. 3,076,768 and 3,207,698;
h. wetting agent: octylphenoxypolyethoxyethanol; available from Rohm & Haas, under "Triton X100" trade designation.

The Example 2 coating after application to and drying on a fibrous glass batt and a fibrous glass board, in an amount equal to approximately 10 pounds per 400 square feet, was subjected to the ASTM E-84 tunnel fire hazard classification. This test showed flame spreads of 20 and 15 for the batt and board, respectively. In comparison to flame spread readings of 20 or more for costlier coating compositions employing neoprene, for example, as a principal ingredient, the formulation of this invention performed favorably. The Example 2 coating received a smoke rating of zero; this also compares favorably with a neoprene based coating which can have smoke ratings as high as 20.

The above described compositions after application to and drying on fibrous glass insulation form a hardened, yet flexible, smooth surface which is highly efficient in minimizing air flow friction which may be caused by the insulating media of which a duct is either composed or lined. These coatings have been found to be extremely resistant to moisture penetration under humid conditions. After dry heat soaking at 250°F. for one week flexibility characteristics are unchanged with no evidence of cracking.

The above-described coating compositions have been disclosed as being most suitable for use as coating on fibrous glass thermal insulation. They may also be used as coatings or paints on any surface where a hardened yet flexible coating is required along with low flame and smoke characteristics.

I claim:

1. The combination of a duct having an air conducting passageway defined by one surface of a layer of fibrous glass insulation and a smooth, flexible coating covering said surface of said insulation, wherein said coating consists essentially of:
   a. 70 to 90 percent of a flame retardant filler selected from the group consisting of aluminum hydrate or magnesium hydrate or a combination thereof;
   b. 5 to 20 percent of a binder selected from the group consisting of vinyl acrylic latex or polyethylene vinyl acetate latex or a combination thereof; and
   c. 1 to 10 percent of a water soluble fire retardant borate selected from the group consisting of sodium borate or boric acid or a combination thereof.

2. The combination of claim 1 wherein said filler comprises 80 to 85 percent of said coating, said binder comprises 10 to 15 percent of said coating and said sodium borate comprises 2 to 4 percent of said coating.

3. Fibrous glass insulating material having a hardened, flexible coating thereon,
  said coating consisting essentially of:
  a. 70 to 90 percent of a flame retardant filler selected from the group consisting of aluminum hydrate or magnesium hydrate or a combination thereof;
  b. 5 to 20 percent of a binder selected from the group consisting of vinyl acrylic latex or polyethylene vinyl acetate latex or a combination thereof; and
  c. 1 to 10 percent of a water soluble fire retardant borate selected from the group consisting of sodium borate or boric acid or a combination thereof.

4. A self-sustaining fibrous glass board having a hardened, flexible coating on at least one major surface thereof,
  said board capable of being shaped into a duct or duct liner,
  said coating consisting essentially of:
  a. 70 to 90 percent of a flame retardant filler selected from the group consisting of aluminum hydrate or magnesium hydrate or a combination thereof;
  b. 5 to 20 percent of a binder selected from the group consisting of vinyl acrylic latex or polyethylene vinyl acetate latex or a combination thereof; and
  c. 1 to 10 percent of a water soluble fire retardant borate selected from the group consisting of sodium borate or boric acid or a combination thereof.

* * * * *